United States Patent Office 3,004,962
Patented Oct. 17, 1961

---

3,004,962
PROCESS FOR POLYMERIZATION OF 1-OLEFINS
Albert S. Matlack, Wilmington, Del., assignor to Hercules Powder Company, Wilmington, Del., a corporation of Delaware
No Drawing. Filed May 27, 1957, Ser. No. 661,572
17 Claims. (Cl. 260—93.7)

This invention relates to the polymerization of olefins under relatively mild conditions of pressure and temperature and, more particularly, to an entirely new type of catalyst system for the polymerization of olefins under such conditions.

K. Ziegler has described the polymerization of ethylene with organometallic compounds of the metals of group III–A of the periodic table, i.e., organometallic compounds of aluminum, gallium and indium to produce polymers varying in molecular weight from dimers up to the wax range polymers. He has also described the preparation of high molecular weight crystalline polymers by contacting ethylene with a mixture of an organo-aluminum compound and a compound of a metal of group IX–B, V–B, VI–B or VIII of the periodic table.

Now in accordance with this invention it has most surprisingly been discovered that ethylene and other 1-olefins may be polymerized under relatively mild conditions of temperature and pressure by contacting the olefin with a metal of group IV–B or V–B of the periodic table in the presence of an inorganic halide selected from the group consisting of hydrogen halides, halogens, and halides of said metals, the metal being in finely divided form and having a freshly exposed surface in contact with the olefin. While the metals of group V–B when used alone are effective for the polymerization of ethylene, the metals of group IV–B are ineffective, and neither group of metals is effective as the sole catalyst for the polymerization of propylene or higher olefins. However, when a halogen, hydrogen halide or halide of one of these said groups IV–B or V–B metals is added to the polymerization system, improved results are obtained and not only is it possible to polymerize ethylene, but propylene and higher olefins may also be polymerized.

The periodic chart used in this specification and appended claims for designating the groups and subgroups of the periodic table is that given in the Handbook of Chemistry and Physics published by Chemical Rubber Publishing Company, Cleveland, Ohio on pages 392–3 of the 36th edition. Thus, the metals designated as groups IV–B and V–B are those that occur in the left-hand side of groups IV and V in the Mendeleev form of the periodic table (see Deming, General Chemistry, sixth edition, 1952, John Wiley & Sons, Inc., New York).

Any 1-olefin such as ethylene, propylene, butene-1, pentene-1, hexene-1, octene-1, styrene, butadiene, isoprene, etc., or mixtures thereof may be polymerized in accordance wtih this invention.

The polymerization process may be carried out in a wide variety of ways. It may be carried out in the presence or absence of an inert organic diluent as reaction medium. Generally, a diluent is used because it simplifies the isolation of the polymer at the end of the polymerization reaction. Any inert liquid organic diluent may be used, as for example, aliphatic hydrocarbons such as hexane, heptane, etc., cycloaliphatic hydrocarbons such as cyclohexane or aromatic hydrocarbons such as benzene, toluene, xylene, etc., or any mixture of such hydrocarbons, halogenated hydrocarbons such as chlorobenzene, etc.

As already mentioned, the group IV–B or V–B metal, i.e. titanium, zirconium, hafnium, vanadium, niobium or tantalum, to be effective as a catalyst for the polymerization is preferably in a finely divided state and presents a freshly exposed surface to the ethylene with which it is contacted. Such finely divided or activated metals may be obtained by ball milling in an inert atmosphere, atomizing the molten metal into an inert atmosphere, reduction of metal oxide with hydrogen, dissolving away part of an alloy, various means of preparing it in colloidal form, etc. In general, the finely divided metal will have an average particle size varying from about 1 micron or less to about 100 microns and preferably from about 1 micron to about 20 microns. Any desired means may be used for contacting the olefin with the finely divided metal having an active surface. A particularly effective method of carrying out the process in accordance with this invention is to ball mill the metal in the presence of the inorganic halide and the olefin, either with or without the inert liquid diluent. By so doing, a fresh surface of the metal catalyst is continually contacted with the inorganic halide and with the olefin being polymerized. A polymerization so started may be transferred to another vessel provided with adequate agitation such as with a high shear agitator. When operating in a ball mill, the metal may be in any desired shape, as for example, strip, foil, flake, etc., which will, of course, be reduced to the desired size during the ball milling operation, but for maximum efficiency it is preferably used in the form of finely divided powder or flake. Another method of operating the process is to atomize the metal into an inert gas and after cooling to about 200° C. or less add the mixture to the olefin stream or mixture of olefin and diluent. The process of this invention may be operated either on a batchwise scale or as a continuous operation.

The amount of the metal used as the catalyst may be varied over a wide range from a minor catalytic amount to a large excess and will in general be governed by the type of operation used. Thus, in a ball mill, relatively small amounts may be used, the maximum amount that may be used depending upon the efficiency of the ball mill operation with such larger amounts. On the other hand, larger amounts may be used when the metal is atomized directly into an ethylene stream, etc. Any one of the metals may be used as the catalyst, or a mixture of them may be used. They may also be used in the form of their alloys with mercury or other metals.

The inorganic halide that is added and which acts as a cocatalyst wtih the finely divided metal may be a halogen, i.e., chlorine, bromine, or iodine, a hydrogen halide such as hydrogen fluoride, hydrogen chloride, hydrogen bromide or hydrogen iodide, or a tri- or tetra-halide of one of the group IV–B or V–B metals, as for example, titanium trichloride or tribromide, titanium tetrachloride, tetrabromide or tetrafluoride, vanadium trichloride, vanadium tetrafluoride, etc. The inorganic halide may be added to the polymerization in any desired form, i.e., its natural form of solid, gas, or liquid, or in the form of a solution in an inert organic diluent.

The amount of the inorganic halide that is added may vary from a minor catalytic amount to a large excess, but generally will be from about 0.05% to about 20% based on the olefin and preferably from about 0.5% to about 5%.

The temperature and pressure used for the polymerization process may be varied over a wide range and will largely depend upon the method by which the olefin is contacted with the surface of the metal and the inorganic halide. In general, the polymerization will be carried out at room temperature or slightly above, but any temperature within the range of from about −80° C. to about 200° C. may be used, preferably from about 0° C. to about 100° C., and more preferably from about 20° C. to about 60° C. In the same way, while atmospheric pressure or a pressure of only a few pounds may be used, the polymerization may be carried out over a wide range of pressures, but higher pressures do not appreciably alter the course of polymerization and, hence, are not required. In general, it is desirable to operate under anhydrous and anaerobic conditions.

The following examples will demonstrate the process of polymerizing 1-olefins in accordance with this invention. The molecular weight of the polymers produced in these examples is indicated by the Reduced Specific Viscosity (RSV) given for each. By the term "Reduced Specific Viscosity" is meant the $\eta_{sp}/c$ determined on an 0.1% solution of the polymer in decalin, containing 0.1 g. of the polymer per 100 ml. of solution (unless otherwise indicated), at 135° C. Where the melting point of the polymer is given, it is the temperature at which the birefringence due to crystallinity disappears. All parts and percentages are by weight unless otherwise indicated.

Examples 1 to 7

In these examples the polymerization was carried out in cylindrical vibratory ball mills which were constructed of stainless steel (analysis: carbon—0.008% max.; Cr—18.00–20.00%; Ni—8.80–10.00%; Mn—2.00% max.) and outfitted with a gas inlet tube and a main opening. The mills were 80% full of 0.5 inch stainless steel balls.

In each case the mill, previously dried for 4 hours at 120° C., was charged with 70 parts of n-heptane which had been dried over sodium and then with the catalyst metal in the form of powder in the case of titanium and granules in the case of vanadium. The mill was then capped, twice filled with dry nitrogen and evacuated, after which the inorganic halide, as a gas in the case of the hydrogen chloride used in Example 1, solid in the case of the iodine used in Example 2, as a solution in heptane in the case of the salts used in Examples 5 and 6, and as slurries in heptane in the case of the salts used in Examples 3, 4 and 7, and propylene were injected, the latter to a pressure of 50 p.s.i.g. After 16 hours of milling at room temperature (about 30° C.) the polymer slurry was removed from the mill. Then heptane-insoluble polymer was isolated by filtration or centrifugation. The polymer so obtained was purified by leaching with a 50:50 mixture of n-butanol and 48% hydrofluoric acid for 16 hours at room temperature, again separating the polymer by filtration and washing it free of acid with water and ethanol and then drying for 16 hours at 80° C. in vacuo. The heptane-soluble polymer was isolated from the reaction mixture filtrate by distilling off the diluent. The catalyst metal and cocatalyst and the amount of each used, the percent of heptane-soluble and heptane-insoluble polymer obtained in each case and the physical properties of the polymers are tabulated below along with control runs wherein metal catalyst but no inorganic halide was added as cocatalyst.

TABLE I

| Example | Metal Catalyst | Parts | Cocatalyst | Parts | Heptane-Soluble Polymer | | Heptane-Insoluble Polymer | | |
|---|---|---|---|---|---|---|---|---|---|
| | | | | | Percent of Total | RSV | Percent of Total | RSV | Melting Point, ° C. |
| Control | Ti | 1.0 | None | | (1) | (1) | (1) | (1) | (1) |
| 1 | Ti | 1.0 | HCl | 0.16 | 67 | 0.9 | 33 | 3.7 | 161 |
| 2 | Ti | 1.0 | Iodine | 1.0 | 43 | 1.2 | 57 | 5.4 | 163 |
| 3 | Ti | 1.0 | TiCl₃ | 0.46 | 73 | 0.3 | 27 | 1.9 | 160 |
| 4 | Ti | 1.0 | TiF₄ | 0.6 | 100 | 0.04 | 0 | | |
| 5 | Ti | 1.0 | TiBr₄ | 0.9 | 54 | 0.8 | 46 | 5.2 | 162 |
| 6 | Ti | 0.5 | TiCl₄ | 0.4 | 100 | | 0 | | |
| Control | V | 1.0 | None | | (1) | (1) | (1) | (1) | (1) |
| 7 | V | 0.5 | VCl₃ | 0.5 | 74 | | 26 | 1.9 | 153 |

¹ No polymer formed.

Examples 8 and 9

The general procedure described in the foregoing examples was repeated except that ethylene was used in place of propylene. After 16 hours of milling at room temperature, the polymer slurry was removed from the mill and the polyethylene was separated by centrifugation. The polymer was then purified by the same method as described above for the heptane-insoluble polypropylenes. The catalyst metal and cocatalyst and the amount of each used, the final pressure, percent conversion to polyethylene and the physical properties of the polymers are tabulated below.

TABLE II

| Example | Metal Catalyst | Parts | Cocatalyst | Parts | Final Pressure, p.s.i.g. | Percent Conversion | RSV | Melting Point, ° C. |
|---|---|---|---|---|---|---|---|---|
| 8 | Ti | 0.50 | TiCl₃ | 0.25 | −11 | 63 | 1.0 | 130 |
| 9 | V | 0.50 | VCl₃ | 0.46 | −10 | 78 | 1.5 | 131 |

What I claim and desire to protect by Letters Patent is:

1. The process of polymerizing a 1-olefin which comprises contacting said olefin, at a temperature of from about 20° C. to about 60° C., with the catalyst formed in situ by mixing a metal, having a particle size of from about 1 micron to about 100 microns and selected from the group consisting of the group IV–B and group V–B metals of the periodic table, with from about 0.05% to about 20% based on the weight of olefin, of an inorganic halide selected from the group consisting of halogens, hydrogen halides, and tri- and tetra-halides of said group IV–B and V–B metals, said metals being present in an amount in molar excess of the amount of said inorganic halide.

2. The process of claim 1 wherein the metal is titanium.
3. The process of claim 1 wherein the metal is vanadium.
4. The process of claim 2 wherein the inorganic halide is a halogen.
5. The process of claim 2 wherein the inorganic halide is a titanium tetrahalide.
6. The process of claim 2 wherein the inorganic halide is a titanium trihalide.
7. The process of claim 3 wherein the inorganic halide is a vanadium trihalide.
8. The process of claim 4 wherein the 1-olefin is propylene.
9. The process of claim 5 wherein the 1-olefin is propylene.
10. The process of claim 6 wherein the 1-olefin is propylene.
11. The process of claim 6 wherein the 1-olefin is ethylene.
12. The process of claim 7 wherein the 1-olefin is propylene.
13. The process of polymerizing propylene which comprises ball milling at a temperature of from about 20° C. to about 60° C., a mixture of propylene, iodine, in an amount of from about 0.05% to about 20% based on the weight of propylene, and titanium having a particle size of from about 1 micron to about 100 microns and present in an amount in molar excess of the amount of iodine.
14. The process of polymerizing propylene which comprises ball milling at a temperature of from about 20° C. to about 60° C., a mixture of propylene, titanium tetrabromide, in an amount of from about 0.05% to about 20% based on the weight of propylene, and titanium having a particle size of from about 1 micron to about 100 microns and present in an amount in molar excess of the amount of titanium tetrabromide.
15. The process of polymerizing propylene which comprises ball milling at a temperature fgrom about 20° C. to about 60° C., a mixture of propylene, titanium trichloride, in an amount of from about 0.05% to about 20% based on the weight of propylene, and titanium having a particle size of from about 1 micron to about 100 microns and present in an amount in molar excess of the amount of titanium trichloride.
16. The process of polymerizing ethylene which comprises ball milling at a temperature of from about 20° C. to about 60° C., a mixture of ethylene, titanium trichloride, in an amount of from about 0.05% to about 20% based on the weight of ethylene, and titanium having a particle size of from about 1 micron to about 100 microns and present in an amount in molar excess of the amount of titanium trichloride.
17. The process of polymerizing propylene which comprises ball milling at a temperature of from about 20° C. to about 60° C., a mixture of propylene, vanadium trichloride, in an amount of from about 0.05% to about 20% based on the weight of propylene, and vanadium having a particle size of from about 1 micron to about 100 microns and present in an amount in molar excess of the amount of vanadium trichloride.

References Cited in the file of this patent

UNITED STATES PATENTS

| | | |
|---|---|---|
| 2,157,965 | Pongratz | May 9, 1939 |
| 2,474,007 | Levine | June 21, 1949 |
| 2,846,427 | Findlay | Aug. 5, 1958 |
| 2,879,263 | Anderson et al. | Mar. 24, 1959 |
| 2,893,984 | Seelbach et al. | July 7, 1959 |

FOREIGN PATENTS

| | | |
|---|---|---|
| 534,888 | Belgium | Jan. 31, 1955 |
| 547,618 | Belgium | Nov. 7, 1956 |
| 534,792 | Belgium | Apr. 2, 1956 |
| 1,132,506 | France | Nov. 5, 1956 |
| 1,134,740 | France | Dec. 3, 1956 |

OTHER REFERENCES

"Comprehensive Treatise of Inorganic and Theoretical Chemistry" (Mellor). Published by Longmans, Green & Co. (New York), volume 7, pages 74–89 relied on.